United States Patent
Matsuno

(10) Patent No.: US 8,005,348 B2
(45) Date of Patent: Aug. 23, 2011

(54) INFORMATION PROCESSING APPARATUS

(75) Inventor: Atsushi Matsuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 36 days.

(21) Appl. No.: 12/352,419

(22) Filed: Jan. 12, 2009

(65) Prior Publication Data

US 2009/0185072 A1   Jul. 23, 2009

(30) Foreign Application Priority Data

Jan. 18, 2008   (JP) ................. 2008-009502

(51) Int. Cl.
*H04N 5/917* (2006.01)
(52) U.S. Cl. .................. 386/355; 386/326; 386/356
(58) Field of Classification Search .............. 386/45–46, 386/326, 355, 356
See application file for complete search history.

(56) References Cited

U.S. PATENT DOCUMENTS

| | | | | |
|---|---|---|---|---|
| 6,393,574 | B1 * | 5/2002 | Kashiwagi et al. | 713/400 |
| 2007/0058933 | A1 * | 3/2007 | Kobayashi et al. | 386/95 |

FOREIGN PATENT DOCUMENTS

| | | |
|---|---|---|
| JP | 07-298258 | 11/1995 |
| JP | 09-074548 | 3/1997 |
| JP | 10-187760 | 7/1998 |
| JP | 2001-245294 | 9/2001 |
| JP | 2004-312116 | 11/2004 |
| JP | 2006-101404 | 4/2006 |
| JP | 2007-079707 A | 3/2007 |
| JP | 2007-258872 A | 10/2007 |

OTHER PUBLICATIONS

Explanation of Non-English Language References.
An English Translation of Notification of Reasons For Rejection mailed by Japan Patent Office for Japanese Patent Application No. 2008-009502 on Mar. 17, 2009.

* cited by examiner

*Primary Examiner* — Jamie Atala
(74) *Attorney, Agent, or Firm* — Knobbe, Martens Olson & Bear LLP

(57) ABSTRACT

According to one embodiment, an information processing apparatus inputs motion picture data generated by encoding a motion picture, each frame image of the motion picture is formed by synthesizing a plurality of images, containing a plurality of image data corresponding to the plurality of images. The apparatus includes a decoding module which decodes each of the image data contained in the motion picture data, and a drawing module which synthesizes each decoded image data to form image data of each frame image. The drawing module includes a measurement module which measures a time period for synthesizing the image data and outputting the synthesized image data, and a frame rate control module which decrements a frame rate related to a composite processing of the motion picture data by reducing the number of composite processing target frames per unit time when the measured time period exceeds a predetermined value.

5 Claims, 4 Drawing Sheets

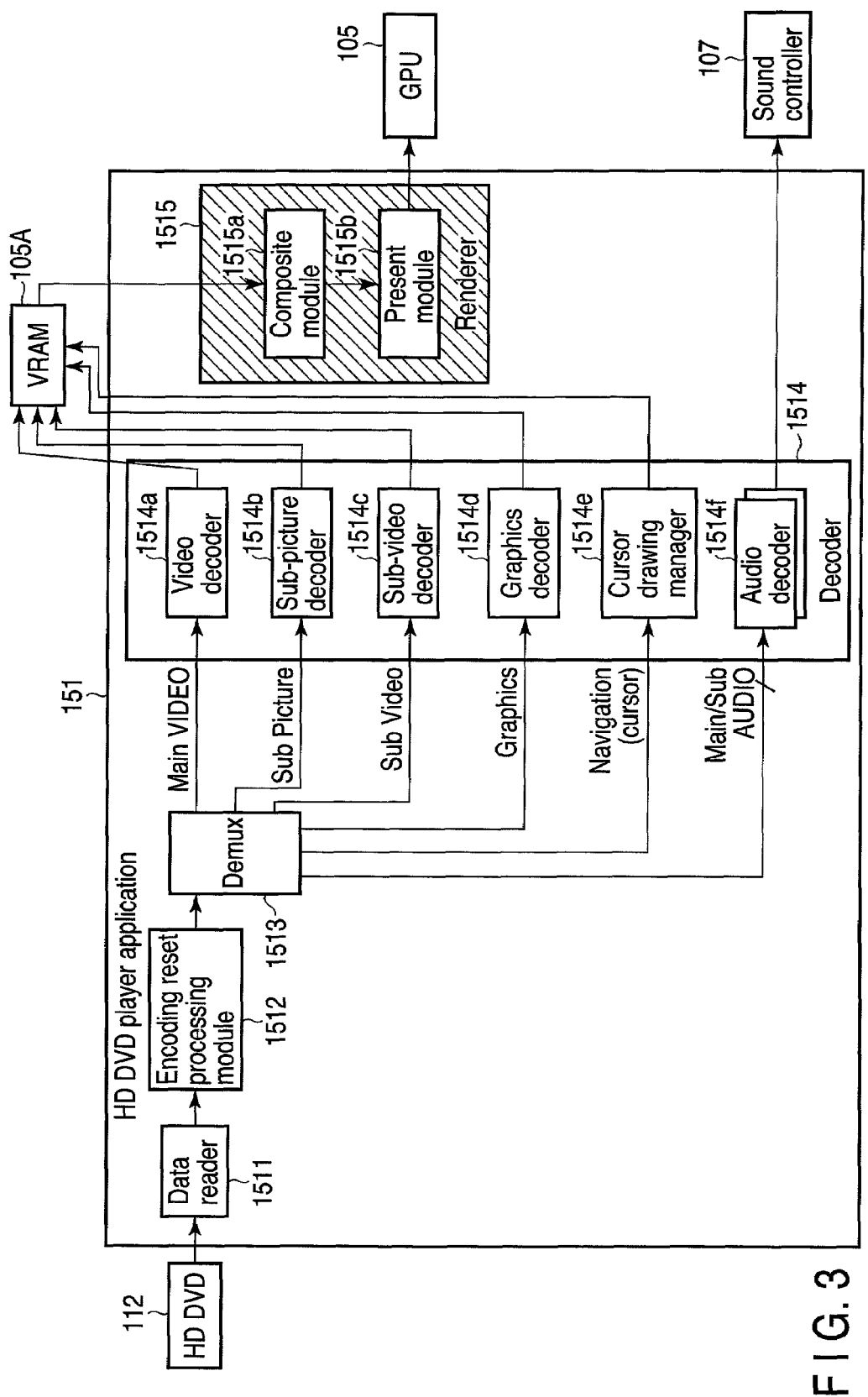
F I G. 3

INFORMATION PROCESSING APPARATUS

CROSS-REFERENCE TO RELATED APPLICATIONS

This application is based upon and claims the benefit of priority from Japanese Patent Application No. 2008-009502, filed Jan. 18, 2008, the entire contents of which are incorporated herein by reference.

BACKGROUND

1. Field

One embodiment of the invention relates to a frame rate control technique preferably applied to an information processing apparatus such as personal computer including a function reproducing a high definition digital versatile disc (HD DVD).

2. Description of the Related Art

Recently, with advantage in digital compression coding technique of motion image, a player capable of handling a high definition video conformable to a high definition (HD) standard has come into wide use. In recent years, software for handling a high definition video of the HD standard has been developed.

The processing capability of a personal computer is largely different depending on the performance of a built-in CPU. In addition, the personal computer can simultaneously operate various software. Thus, the operating environment of each software is largely variable on the same personal computer.

Considering the foregoing circumstances, various proposals have been made so far (e.g., see Jpn. Pat. Appln. KOAKI Publication No. 2001-245294). According to the proposal, decoding of digital compression coded motion video data is switched to a simple operation to reduce load in accordance with the condition.

According to the HD DVD Video standard, five Planes, that is, Plane 1 to Plane 5 are defined. Cursor, graphics, sub-picture, sub-video and main video are assigned to each of planes. Thus, five images have a need be synthesized to the maximum to reproduce a HD DVD Video standard AV content stored in a DVD media. Therefore, in addition to decoding, rendering processing of synthesizing and drawing a plurality of images considerably increases.

However, the foregoing Publication No. 2001-245294 has variously studied a mechanism of controlling decoding processing. But, actually, a mechanism of controlling the foregoing rendering processing has not any studied so far. An increase of the rendering processing is a factor of causing the following problem. According to the problem, even if decoding is reduced to the maximum limit, there is a possibility that a drop frame is generated. Therefore, it is deeply desired to propose a mechanism of controlling the rendering processing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary functional block diagram showing an image processing of a HD DVD player application operating on the computer of the embodiment.

DETAILED DESCRIPTION

Figure 1:
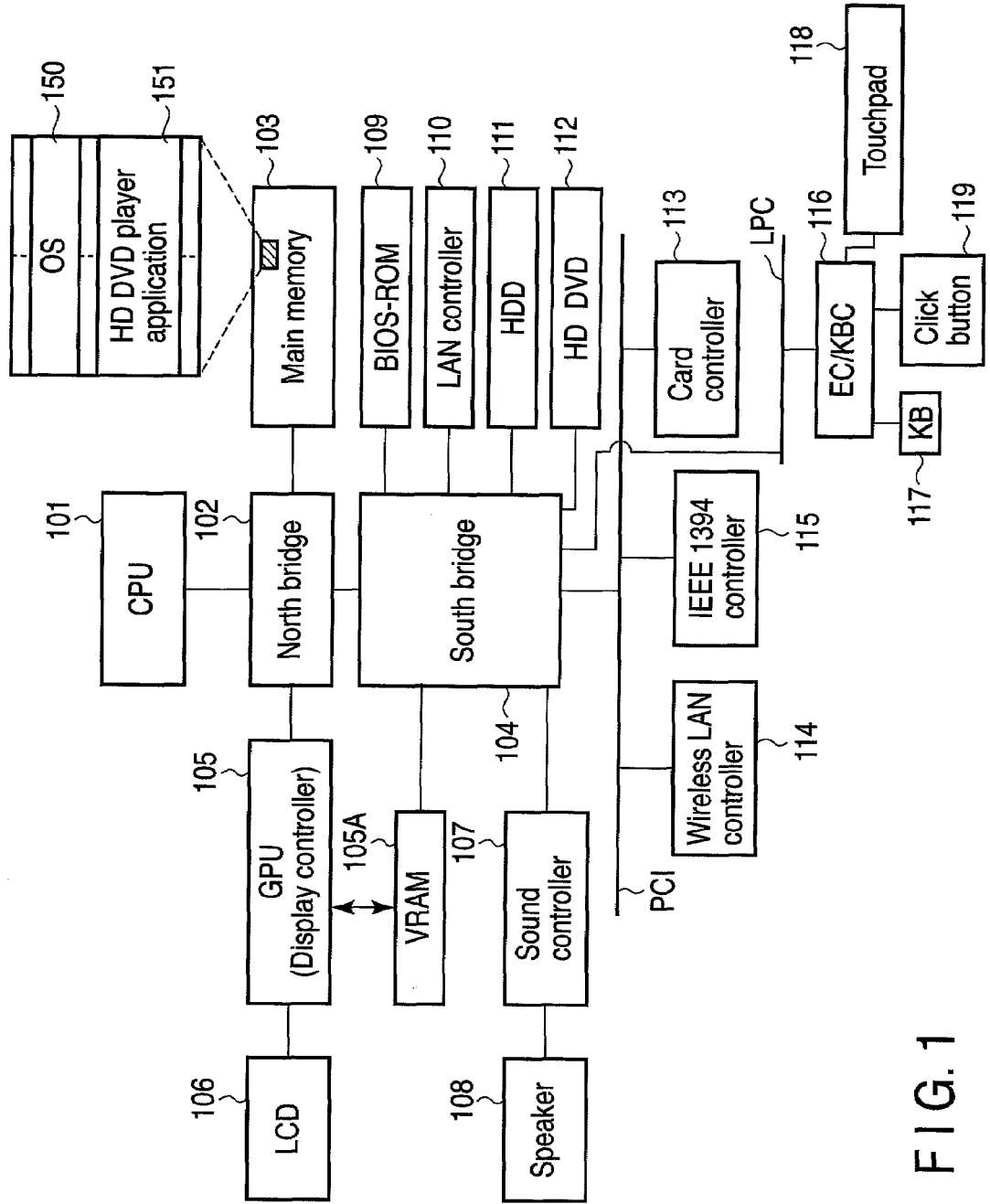
FIG. 1 is an exemplary block diagram showing a system configuration of a computer according to an embodiment of the invention.

Various embodiments according to the invention will be described hereinafter with reference to the accompanying drawings. In general, according to one embodiment of the invention, an information processing apparatus inputs motion picture data generated by encoding a motion picture, each frame image of the motion picture is formed by synthesizing a plurality of images, containing a plurality of image data corresponding to the plurality of images. The apparatus includes a decoding module which decodes each of the image data contained in the motion picture data, and a drawing module which synthesizes each decoded image data to form image data of each frame image. The drawing module includes a measurement module which measures a time period for synthesizing the image data and outputting the synthesized image data, and a frame rate control module which decrements a frame rate related to a composite processing of the motion picture data by reducing the number of composite processing target frames per unit time when the measured time period exceeds a predetermined value.

FIG. 1 is an exemplary block diagram showing a system configuration of an information processing apparatus according to the embodiment. The information processing apparatus is realized as a notebook type personal computer, for example.

As shown in FIG. 1, the computer includes a CPU 101, a north bridge 102, a main memory 103, a south bridge 104, a graphics processing unit (GPU) 105, a video memory (VRAM) 105A, a LCD 106, a sound controller 107, and a speaker 108. The computer further includes a BIOS-ROM 109, a LAN controller 110, a hard disk driver (HDD) 111, a HD DVD drive 112, a card controller 113, a wireless LAN controller 114, an IEEE 1394 controller 115, an embedded controller/keyboard controller (EC/KBC) 116, a keyboard (KB) 117 a touchpad 118 and a click button 119.

The CPU 101 is a processor for controlling the operation of a computer, and executes various programs loaded from the HDD 111 to the main memory 103. Various programs executed by the CPU 101 includes an operating system 150, and a HD DVD player application program for reproducing an AV content of the HD DVD Video standard. In addition, the CPU 101 executes a basic input output system (BIOS) stored in the BIOS-ROM 109. The BIOS is a program for controlling hardware.

The north bridge 102 is a bridge device, which makes a connection between a local bus of the CPU 101 and the south bridge 104. The north bridge 102 includes a built-in memory controller for making an access control of the main memory 103. The north bridge 102 further includes a function of executing communications with the GPU 105 via a PCI EXPRESS standard serial bus. The GPU 105 is a display controller for controlling the LCD 106 used as a display monitor of the computer.

The south bridge 104 controls each device on a peripheral component interconnect (PCI) bus and each device on a low pin count (LPC) bus. The south bridge further includes a built-in integrated drive electronic (IDE) controller for controlling the HDD 11 and the HD DVD drive 112. The south bridge 104 further includes a function of executing communications with the sound controller 107. The sound controller 107 is a sound source device, and outputs reproduction target audio data to the speaker 108.

The card controller 113 controls cards such as PC card and secure digital (SD) card. The wireless LAN controller 114 is a wireless communication device, which executes IEEE 802.11 standard wireless communications, for example. The IEEE 1394 controller 115 executes communications with external device via an IEEE 1394 standard serial bus. The EC/KBC 116 is a one-chip microcomputer, which is integrated with an embedded controller for power management, and a keyboard controller for controlling the KB 117, the touchpad 18 and the click button 119.

Figure 2:
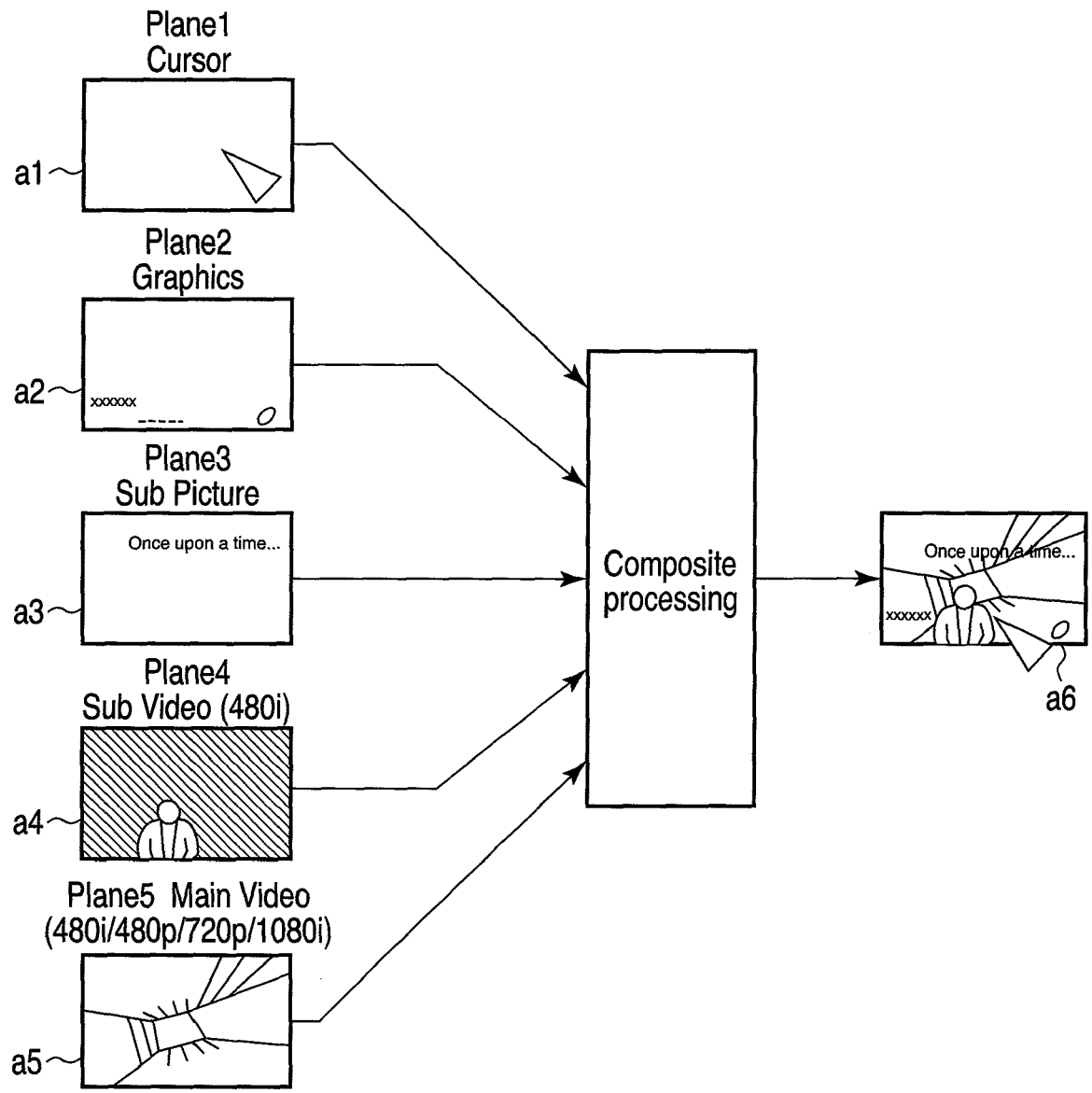
FIG. 2 is an exemplary conceptual view to explain an image configuration of an AV content of a HD DVD-Video standard.

An image configuration of an AV content of the HD DVD Video standard will be described with reference to FIG. 2.

According to the HD DVD Video standard, five Plane, that is, Plane 1 to Plane 5 are defined. Cursor, graphics, sub-picture, sub-video and main video are assigned to each layer. Thus, a HD DVD Video standard AV content stored in a DVD media includes main video data, sub-video data, sub-picture data, graphics data, and navigation data (in addition, includes main audio data and sub-audio data as audio data).

The navigation data further includes a script (XML). The script is data for controlling graphics data and the display of a cursor in accordance with the operation of a pointing device (i.e., touchpad 118 and click button 119) by the user. Thus, the script describes a shape of the cursor and a cursor area capable of arranging the cursor.

Specifically, the HD DVD Video standard AV content forms a target image "a6" by synthesizing five images "a1" to "a5" of Plane 1 to Plane 5 every frame. In general, the foregoing HD DVD Video standard AV content is rendered at a frame rate of 60 fps (frames/second). Thus, if the refresh rate of the LCD 106 is set to 60 Hz, synthesis and rendering must be performed at time from 16 to 17 ms.

The computer includes the following function of reducing a frame rate related to rendering in accordance with various conditions. According to the function, a HD DVD player application program 151 reproducing the HD DVD Video standard AV content is set so that a so-called drop frame is not generated. Hereinafter, the foregoing point will be described.

FIG. 3 is an exemplary functional block diagram showing an image processing of the HD DVD player application program 151 reproducing the HD DVD Video standard AV content having the foregoing image configuration.

The HD DVD player application program 151 is an application program operating under the control of an operating system 150. As shown in FIG. 3, the HD DVD player application program 151 includes a data reader 1511, an encoding reset processing module 1512, a de-multiplexer (Demux) 1513, a decoder 1514 and a renderer 1515.

The decoder 1514 includes a video decoder 1514a, a sub-picture decoder 1514b, a sub-video decoder 1514c, a graphics decoder 1514d, a cursor drawing manager 1514e and an audio decoder 1514f. The renderer 1515 includes a composite module 1515a and a present module 1515b.

The data reader 1511 reads the HD DVD Video standard AV content (main video data, sub-video data, sub-picture data, main audio data, sub-audio data, graphics data, and navigation) stored in the DVD media using the HD DVD drive 112. The foregoing each data is encoded, and multiplexed as a HD DVD stream.

The HD DVD stream read by the data reader 1511 is supplied to the encoding reset processing module 1512 so that encoding is reset. The encoding reset HD DVD stream is supplied to the Demux 1513.

The Demux 1513 separate the HD DVD stream into each data. Each data separated by the Demux 1513 is supplied to the decoder 1514. Specifically, the main video data is decoded by the video decoder 1514a, the sub-picture data is decoded by the sub-picture decoder 1514b, and the sub-video data is decoded by the sub-video decoder 1514c. The graphics data is decoded by the graphics decoder 1514d, and main and sub-audio data are decoded by the audio decoder 1514f. The navigation data is supplied to the cursor drawing manager 1514e. The cursor drawing manager 1514e generates cursor data based on a script (XML) included in the navigation data.

The foregoing main video data, sub-picture data, sub-video data and graphics data decoded by the decoder 1514 and the cursor data generated by the decoder 1514 are stored in the VRAM 105A. The main memory 103 may be used as an area for storing these data. These data are read from the renderer 1515, and synthesized by the composite module 1515a. Thereafter, these data is output to the GPU 105 by the present module 1515b, and then, displayed on the LCD 106 via the GPU 105. The main audio data and the sub-audio data decoded by the decoder 1514 are output to the speaker via the sound controller 107.

The renderer 1515 measures a time period for composite processing of image data by the composite module 1515a and output processing of composite image data by the present module 1515b. The renderer 1515 monitors whether or not the measured value exceeds the foregoing 16 ms. If the value exceeds 16 ms, the renderer 1515 inherently handles 60 frames for one second; however, in this case, the number of processing target frames per unit time is stepwise (i.e., ½, ⅓, ¼) reduced. For example, the frame rate is reduced from 60 fps to 30 fps. The frame rate is reduced as described above; nevertheless, if the measured time period exceeds 16 ms, the frame rate is reduced from 30 to 20 fps, and further, reduced to 15 fps. The foregoing reduction of the frame rate is carried out by thinning.

Conversely, for example, the number of Planes to be synthesized decreases, and the operating environment of the computer is improved (by the operation end of other software). By the foregoing factor, if there is a tendency that the measured time period is shortened, the renderer 1515 stepwise increment the reduced frame rate to return it.

As described above, in the HD DVD player application program (reproducing the HD DVD Video standard AV content) operating on the computer, the renderer 1515 includes a mechanism of controlling rendering processing. This embodiment does not describe a mechanism of controlling decoding processing. However, it is granted that the decoder 1514 includes a variously proposed mechanism of controlling decoding processing.

Figure 4:
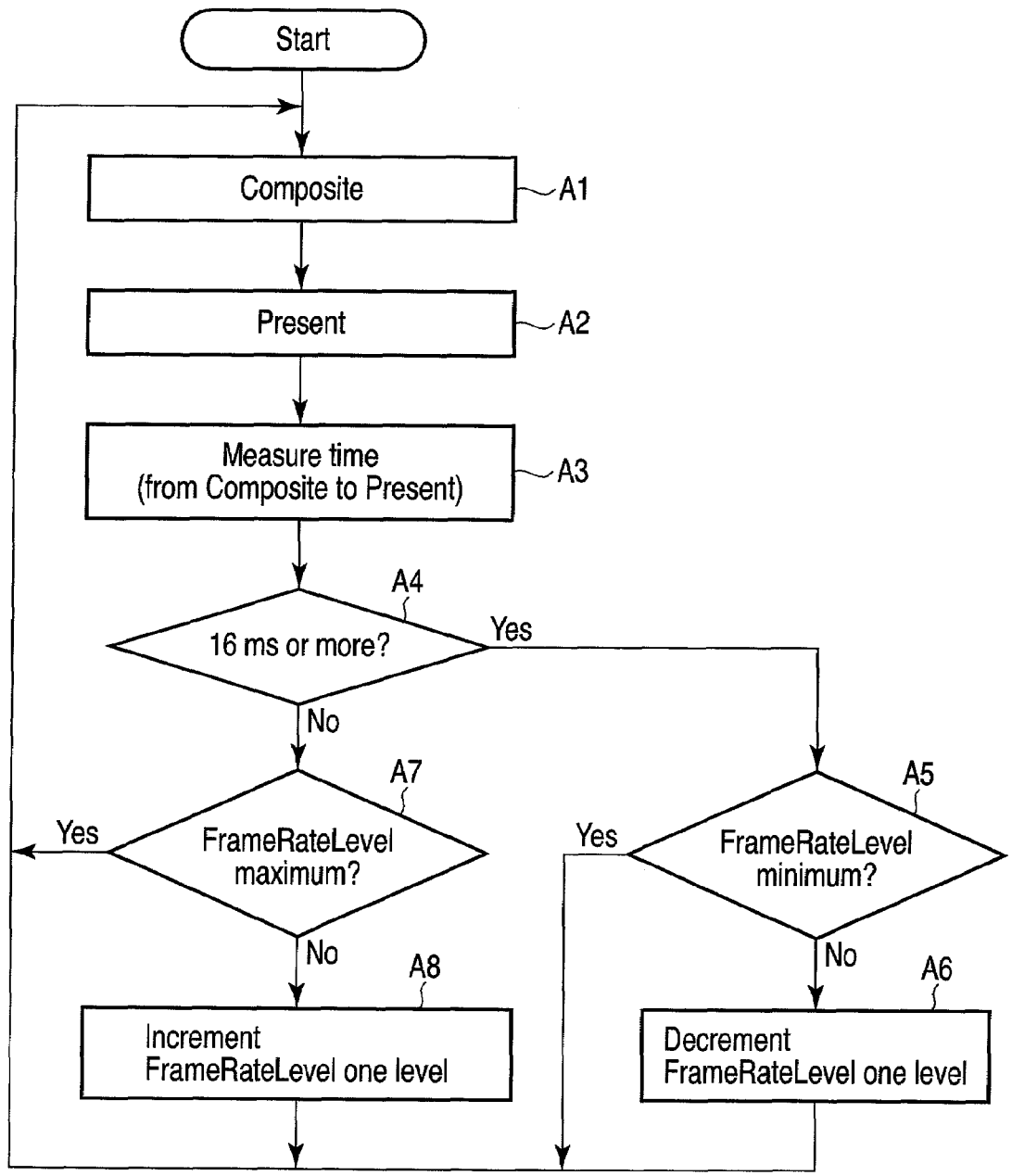
FIG. 4 is an exemplary flowchart showing a rendering operation procedure executed by a HD DVD player application operating on the computer of the embodiment.

FIG. 4 is an exemplary flowchart showing a rendering operation procedure executed by the HD DVD player application program 151 operating on the computer.

In the renderer 1515 of the HD DVD player application program 151, the composite module 1515a synthesizes a plurality of image data decoded or generated by the decoder 1514 and stored in the VRAM 105A (block A1). The present module 1515b outputs the synthesized image data (block A2).

The renderer 1515 measures a time period for the composite processing by the composite module 1515a and output processing by the present module 1515b in blocks A1 and A2 (block A3). The renderer 1515 monitors whether or not the measured value exceeds 16 ms (block A4).

If the measured value exceeds 16 ms (YES in block A4), the renderer 1515 investigates whether or not the present frame rate is the minimum (block A5). If the present frame rate is not the minimum (NO in block A5), the frame rate is decremented one level (block A6).

If the measured is within a range of 16 ms (NO in block A4), the renderer 1515 investigates whether or not the present frame rate is the maximum (block A7). If the frame rate is not the maximum (NO in block A7), the frame rate is incremented one level (block A8).

As described above, the computer realizes a proper control of rendering processing of drawing a plurality of images while synthesizing it in accordance with various conditions when a plurality of images is synthesized and motion picture formed with each frame image.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an input module configured to input encoded video data, wherein each frame of the video data is formed by compositing a plurality of images comprising a plurality of image data corresponding to the plurality of images;
   a decoder configured to decode each image data in the video data; and
   a drawing module configured to composite each image data decoded by the decoding module in order to generate image data of each frame,
   the drawing module comprising:
   a measurement module configured to measure a time period for compositing the image data and outputting the composite image data; and
   a frame rate controller configured to reduce a frame rate of a composite processing of the video data by reducing the number of composite processing target frames per unit time, when the time period measured by the measurement module exceeds a threshold value.

2. The information processing apparatus of claim 1, wherein the frame rate controller of the drawing module is configured to stepwise reduce a frame rate.

3. The information processing apparatus of claim 1, wherein the frame rate controller of the drawing module is configured to increase the frame rate when the time period measured by the measurement module is smaller than the threshold value after reducing the frame rate.

4. The information processing apparatus of claim 1, wherein the image data comprises first video data, second video data, picture data for displaying subtitles and graphics data for displaying an operation guidance.

5. An information processing apparatus comprising a function of displaying a video, each frame of the video is generated by compositing a plurality of images, comprising:
   a measurement module configured to measure a time period of a composite processing of the images; and
   a frame rate controller configured to reduce a frame rate of a composite processing of the video by reducing the number of composite processing target frames per unit time, when the time period measured by the measurement module exceeds a threshold value.

* * * * *